(12) United States Patent
Duboy et al.

(10) Patent No.: US 8,919,375 B2
(45) Date of Patent: Dec. 30, 2014

(54) VALVE WITH POSITION SENSOR

(75) Inventors: Dominique Duboy, Gradignan (FR); Christophe Amagat, Bordeaux (FR)

(73) Assignee: KSB S.A.S., Gennevilliers Cedex (FR)

( * ) Notice: Subject to any disclaimer, the term of this patent is extended or adjusted under 35 U.S.C. 154(b) by 225 days.

(21) Appl. No.: 13/703,012

(22) PCT Filed: May 18, 2011

(86) PCT No.: PCT/FR2011/000300
§ 371 (c)(1),
(2), (4) Date: Dec. 21, 2012

(87) PCT Pub. No.: WO2011/154620
PCT Pub. Date: Dec. 15, 2011

(65) Prior Publication Data
US 2013/0206258 A1    Aug. 15, 2013

(30) Foreign Application Priority Data

Jun. 9, 2010 (FR) ...................................... 10 02436

(51) Int. Cl.
*F16K 37/00* (2006.01)
*E03B 7/07* (2006.01)
*G01D 11/24* (2006.01)

(52) U.S. Cl.
CPC ............... *E03B 7/07* (2013.01); *F16K 37/0033* (2013.01); *G01D 11/245* (2013.01); *F16K 37/0041* (2013.01)
USPC ................... 137/554; 324/207.2; 324/207.25; 340/870.31

(58) Field of Classification Search
USPC ............. 137/554; 324/207.2, 207.13, 207.25; 340/870.31, 870.37
See application file for complete search history.

(56) References Cited

U.S. PATENT DOCUMENTS

| | | | |
|---|---|---|---|
| 4,004,560 A | 1/1977 | Brungsberg | |
| 4,156,437 A * | 5/1979 | Chivens et al. | 137/554 |
| 4,663,601 A | 5/1987 | Troutman et al. | |
| 5,097,209 A * | 3/1992 | Santos | 324/207.25 |
| 6,098,646 A * | 8/2000 | Hennemann et al. | 137/554 |
| 6,252,394 B1 * | 6/2001 | Roze et al. | 324/207.25 |
| 6,314,994 B1 | 11/2001 | Listl | |
| 6,528,992 B2 * | 3/2003 | Shinjo et al. | 324/207.25 |
| 7,391,205 B2 * | 6/2008 | Gandel et al. | 324/207.25 |
| 2002/0089324 A1 * | 7/2002 | Miyata et al. | 324/207.25 |
| 2003/0033867 A1 * | 2/2003 | Posey et al. | 137/554 |
| 2004/0164733 A1 | 8/2004 | Fukaya et al. | |
| 2007/0108968 A1 * | 5/2007 | Ootawara et al. | 324/207.25 |
| 2008/0087858 A1 * | 4/2008 | Hatsuzawa et al. | 324/207.25 |
| 2010/0207616 A1 * | 8/2010 | Wolschlager et al. | 324/207.25 |

FOREIGN PATENT DOCUMENTS

EP    0 148 046 A1    7/1985
WO    WO 03/100950 A1    12/2003

* cited by examiner

*Primary Examiner* — John Rivell
(74) *Attorney, Agent, or Firm* — Renner, Kenner, Greive, Bobak, Taylor & Weber

(57) ABSTRACT

Valve comprising a shutter (2) rotating as one (A) with a shaft (3) and a sensor sensing the rotational position of the shaft (3), which comprises a target holder (4a) push-fitted onto the shaft (3), a plate (6) slipped onto the shaft (3), the target holder (4a) and the annular part (6a) being in one and the same plane.

8 Claims, 1 Drawing Sheet

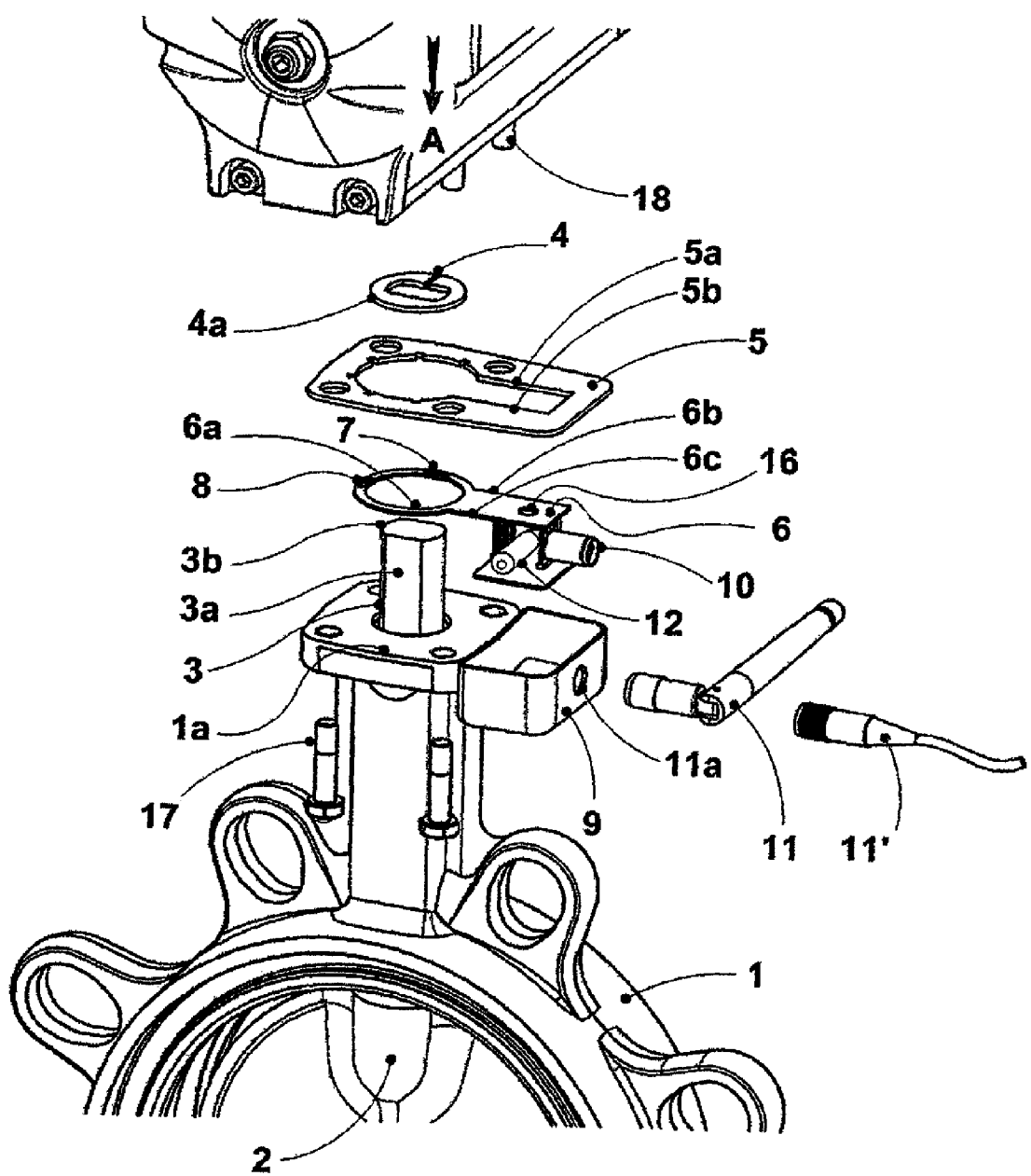

VALVE WITH POSITION SENSOR

Numerous solutions have already been developed in the detection and signalling of the position of quarter-turn valves, whether they be butterfly, ball or spherical-segment valves.

The majority of these solutions consist in designing the valve and its actuation and in adding the detection to the operating part. Thus there are position-detectors for manual or pneumatic or hydraulic actuators that are mounted on an attached shaft outlet, generally placed on the upper portion of the apparatus or at the side.

Solutions of this type have already been described in the patents of Hitachi No. US 2004/0085062 or else ASCO Controls No. U.S. Pat. No. 6,242,909 or ROTECH No. DE 102008014400 and EP 0965821 or even Peter Zovath No. U.S. Pat. No. 5,278,530.

The disadvantages of such solutions are numerous:

The indication of the position of the shaft of the valve is not direct. It is transferred via a varying number of mechanical portions which can fail, especially the shaft itself of the valve which can break, while the indication of the position by the operating part continues to indicate a position which is no longer that of the closure member.

The position-indicators, treated as accessories, are added to the operating parts as options and thus present a hindrance which is often excessive.

In the case of industrial processes that require a large number of valves in a confined space, as in the pharmaceutical or food-processing industries, the electrical connections of all these detectors need a lot of time for connection and are the source of a large number of wiring faults. This leads to costs with respect to installation, implementation and accommodation of the installations that are very considerable.

Other solutions propose installing the sensors, be it on the body of the valve by means of drilled or welded arrangements, or else detect the position of the closure member by means of accessories mounted on the lower axis of the valve.

Solutions of this type have already been described in the patents of Keystone International No. GB 2142710 or else I.C.I. No. U.S. Pat. No. 4,468,559.

These solutions call for the valve to be modified or converted.

The invention proposes to overcome the faults set out above by using a standard quarter-turn valve and its operating part without making any change thereto. In a new design mode, it is proposed that a single position-sensor be realised that is able to be used with any type of operating part, whether it be a handle, a manual reduction unit or else a pneumatic, hydraulic or electrical automatic actuator.

The object of the invention is a valve comprising a closure member, rotating in unison with a shaft actuated by an actuator and passing through a fixed plate, and a sensor for sensing the rotational position of the shaft, characterised in that:

there is only one single transmission coupling of the torque between the shaft (3) and the actuator (A), the position-sensor is supported by the plate and comprises:

an annular target-holder carrying a target sensitive to an action at a distance and fitted on the shaft in such a way as to rotate in unison therewith and to be able to be displaced in translation along the shaft, a small plate threaded on the shaft by way of an annular portion without being rotationally unified therewith, this portion containing two detectors of the target, one at 90° with respect to the other, the target-holder and the annular portion are in the same plane.

By inserting a very thin position-sensor of a thickness of a few millimetres, in particular from 1.5 to 4 mm, which is not a torque-transmitter, both in the annular portion of the small plate and in the target-holder, in order to detect the position of the closure member of the valve directly on the operating shaft, something which does not change the modes of connection and driving of the valve by the operating part at all, a detection is ensured without any spurious effect and without contact of the rotational position of the closure member, it being possible to transmit this position, interpreted by a suitable electronic means, to the process control even if the sealing device between the butterfly and the body of the valve is metallic.

In accordance with the invention there is no additional coupling which brings about an inevitable angular fault with each coupling owing to the clearance that is necessary between the male portion and the female portion.

Preferably, at least the annular portion of the small plate, and better still the whole of the small plate, and the target-holder have the same thickness. Preferably, the small plate is surrounded by a plate-holder, the thickness of which is greater than that of the small plate. This allows for it to be seen that the upper face of the small plate is covered with a resin until it is flush with the upper face of the plate-holder. The resin protects the small plate with a printed circuit and immobilizes it. The small plate can contain a hole opening into a casing filled with resin arranged underneath the lower face of the small plate. The small plate and the plate-holder are immobilized by the resin which is poured into the casing and which fills all the interstices until flush with the plate-holder in order to fix all of the components there. Likewise, the target can be fixed in the target-holder by moulding resin thereon.

In accordance with one embodiment, the plate-holder is fixed by gripping between the fixed plate of the valve and the supporting face of the actuator, in particular by means of screws or bolts.

The casing has an opening for connection of an element for transmission of an electrical signal emitted by the printed circuits of the small plate. This element can be an antenna or a connector.

The detectors can preferably be Reed bulbs or Hall-effect detectors, the target being a magnet in this case. The detectors can also be inductive proximity detectors, the target being a metallic element in this case with a high level of magnetic permeability. The detectors can also be radiation-emitters, and the target can be of an opaque material that interrupts the radiation when it is on its course.

The shaft can have a flat surface (a meplat). In other structural embodiments the shaft can have other driving means, such as a square, star-shaped, fluted or wedge-shaped section.

In the attached drawing, given solely by way of example, the single FIGURE is an exploded perspective view of a valve in accordance with the invention.

The valve shown in the single FIGURE comprises an annular valve body 1 on which there is rotatably mounted a closure member 2 rotationally unified with a shaft 3 which is rotationally driven by an actuator symbolized by the arrow A and whose transverse section presents two straight and parallel sides 3a, in such a way as to form flat surfaces, and two curved sides 3b following an arc of a circle, the sides 3a being opposite one another, and the sides 3b being opposite one another.

The shaft 3 passes beyond a plate 1a of the body 1.

Fitted on the shaft 3 there is a target-holder 4a carrying a target 4 which, in the case in point, is a magnet. The target-holder 4a is annular, its central hole having a profile which is just greater than the transverse section of the shaft 3 and of the same shape so that the target-holder 4a can slide on the shaft 3 and in fact until it comes into contact with the plate 1a, but is unable to turn in relation to said shaft 3. The target-holder 4a is thus rotationally unified with the shaft 3. The target-holder 4a has a thickness which is just less than the thickness of the plate-holder 5 described above.

Positioned around the target-holder 4a, concentrically with respect to the shaft 3, there is a small plate 6 with a printed circuit that is fixed in relation to the plate 1a owing to the positioning of the straight faces 6b and 6c corresponding to the straight faces 5a and 5b of the plate-holder 5. This small plate carries two Reed bulbs 7, 8, one at 90° with respect to the other, on the circumference of the circular portion 6a. The hole of the circular portion 6a is larger than the external profile of the target-holder 4a so that the latter can pass through it freely without contact.

The target-holder 4a and the annular portion 6a are in the same plane, perpendicular to the shaft 3. The annular portion 6a and the small plate 6 each have a thickness which is just less than the thickness of the plate-holder 5.

The small plate 6 is surrounded by a plate-holder 5. The thickness of the plate-holder 5 is greater than that of the small plate 6. Depending on the size of the plate 1a, and thus of the plate-holder 5, this is between 1.5 and 4 mm.

A through-hole 16 is provided in the small plate 6 and opens into the casing 9, which contains an opening 11a for connection of a wire 11 or of an antenna 11'.

When the shaft 3 turns by 90°, one of the detectors 8, which was not opposite the magnet 4, comes to be opposite it, whilst the other 7, which was opposite the magnet 4, is no longer opposite it. The small plate 6 with the printed circuit produces an electrical signal from this which is transmitted, through the cable 11' or the antenna 11 passing through the opening 11a of the casing 9, to a device for utilizing this signal (not shown).

In order to be able to be adapted to valves, whose driving means are different from driving by means of flat surfaces (meplats), the central hole of the target holder 4a can be adapted to the section of the shaft 3 which can be in the form of a star, in the form of a square, fluted, wedge-shaped or in another form.

The invention claimed is:

1. Valves and fittings apparatus comprising:
    a valve with a closure member (2) rotating in unison with a shaft (3),
    an actuator (A) driving the shaft (3) in rotation, and
    an annular sensor of the rotational position of the shaft (3) fitted on the shaft (3), characterised in that
    the sensor is interposed, in the longitudinal direction of the shaft (3), between the valve and the actuator (A) and has a thickness, that is, the dimension in the longitudinal direction of the shaft (3), between 1.5 and 4 mm,
    the sensor including:
    an annular target-holder (4a) carrying a target (4) sensitive to an action at a distance and fitted on the shaft (3) in such a way as to rotate in unison therewith and to be able to be displaced in translation along the shaft (3),
    a plate-holder (5), the thickness of which is higher than the thickness of all the other components of the sensor,
    a small plate (6) fitted on the shaft (3) by way of an annular portion (6a) without being rotationally unified therewith, this portion (6a) containing two detectors (7, 8) of the target (4), at 90° one with respect to the other, and
    the target-holder (4a) and the annular portion (6a) are in the same plane.

2. Apparatus according to claim 1, characterised in that the plate-holder (5) is gripped between a fixed plate (1a) of the valve and the actuator (A) so that the three parts are unified.

3. Apparatus according to claim 1, characterised in that the upper face of the small plate (6) is coated with a resin until it is flush with the upper face of the plate-holder (5).

4. Apparatus according to claim 3, characterised in that the small plate (6) contains a hole (16) opening into a casing (9) filled with resin arranged underneath the lower face of the small plate.

5. Apparatus according to claim 4, characterised in that the casing (9) has an opening (11a) for connection of an element for transmission of an electrical signal emitted by printed circuits of the small plate (6).

6. Apparatus according to claim 1, characterised in that the target (4) is fixed in the target-holder (4a) by moulding resin thereon.

7. Apparatus according to claim 5, characterised in that, after introducing and polymerising of the resin in the casing (9) and until the resin is flush with the upper face of the plate-holder (5), all the components comprising the plate-holder (5) the small plate (6), the detectors (7, 8), the casing (9), a battery (12), a connector (10) and an antenna (11), are bound in a sensor assembly (CP) without any possibility to separate them.

8. Sensor comprising:
    an annular target-holder (4a) carrying a target (4) sensitive to an action at a distance and fitted on a shaft (3) in such a way as to rotate in unison therewith and to be able to be displaced in translation along the shaft (3),
    a plate-holder (5) which forms the body of the sensor and the thickness of which is higher than the thickness of all the other components of the sensor,
    a small plate (6) fitted on the shaft (3) by way of an annular portion (6a) without being rotationally unified therewith, this portion (6a) containing two detectors (7, 8) of the target (4), at 90° one with respect to the other, and
    the target-holder (4a) and the annular portion (6a) are in the same plane.
    characterised in that:
    the small plate (6) contains a hole (16) opening into a casing (9) filled with resin arranged underneath the lower face of the small plate, and
    the plate-holder (5) the small plate (6), the detectors (7, 8), the casing (9), a battery (12), a connector (10) and an antenna (11), are bound in a sensor assembly (CP) without any possibility to separate them.

* * * * *